United States Patent [19]
Kato

[11] 3,766,684
[45] Oct. 23, 1973

[54] APPARATUS FOR HYDROPONIC CULTIVATION

[76] Inventor: Naoe Kato, 386 Nagano-ken, Ueda-shi, Midorigaoka 1-chome 25-ban 18-go, Nagano-ken, Ueda-shi, Japan

[22] Filed: Dec. 3, 1971

[21] Appl. No.: 204,532

[30] Foreign Application Priority Data
Dec. 11, 1970 Japan.............................. 45/110724
Dec. 11, 1970 Japan.............................. 45/124134
Dec. 11, 1970 Japan.............................. 45/124136
Dec. 11, 1970 Japan.............................. 45/124137
Dec. 11, 1970 Japan.............................. 45/124138

[52] U.S. Cl. ................................................. 47/1.2
[51] Int. Cl............................................. A01g 31/02
[58] Field of Search.......................... 47/1.2, 38–39, 47/38.1, 34

[56] References Cited
UNITED STATES PATENTS
2,026,322  12/1935  Raines ..................................... 47/38
2,189,510  2/1940  Swaney.................................. 47/1.2
3,177,616  4/1965  Sawyer................................... 47/1.2
3,241,264  3/1966  Porter et al.......................... 46/38.1
3,352,057  11/1967  Ferrand ................................ 47/1.2

FOREIGN PATENTS OR APPLICATIONS
183,529  8/1966  U.S.S.R.

Primary Examiner—Robert E. Bagwill
Attorney—Edwin E. Greigg

[57] ABSTRACT

An apparatus for hydroponic cultivation designed to hold a plant in a suspended state, establish contact between the root of the plant a screen for flowing a nutrient solution disposed outwardly of the root. The nutrient solution is fed from above the screen to flow down therealong so that the nutrient solution may be fed to the root without immersing the root in the nutrient solution. The nutrient solution is circulated for re-use. The root contacts air. A satisfactory cultivation free from the decay and undergrowth of the results.

17 Claims, 3 Drawing Figures

Patented Oct. 23, 1973 3,766,684
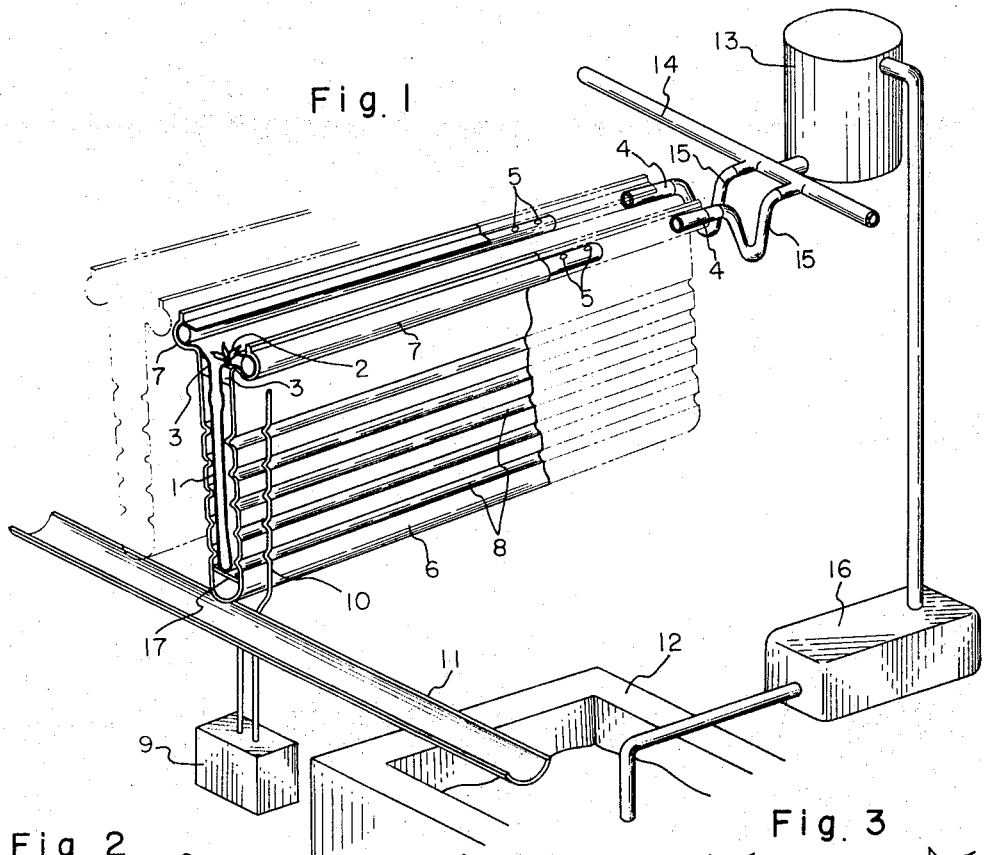
Fig. 1
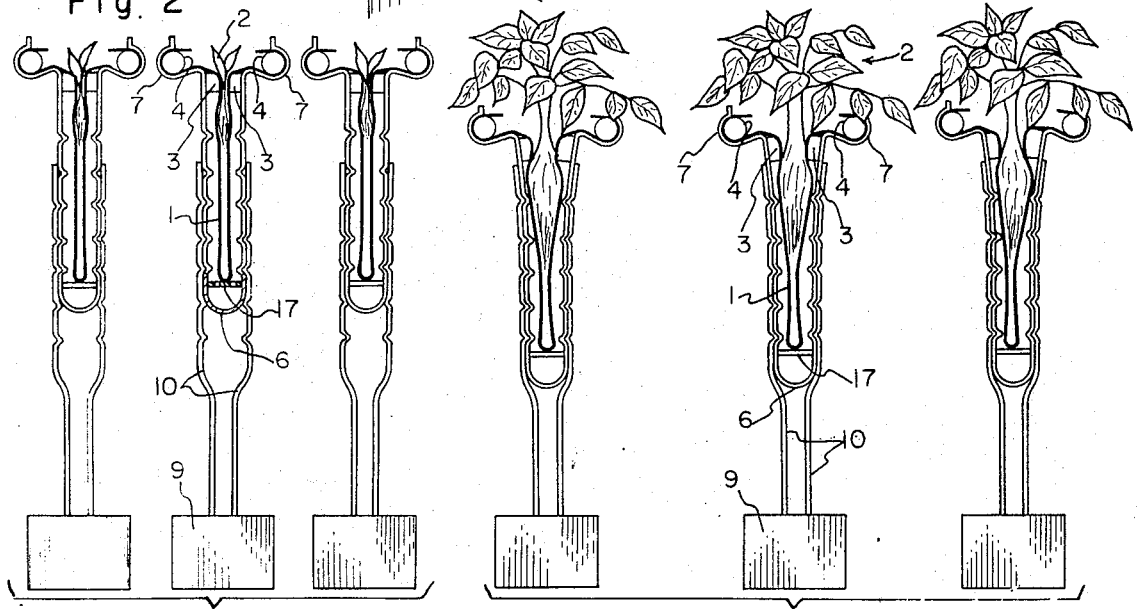
Fig. 2
Fig. 3

APPARATUS FOR HYDROPONIC CULTIVATION

BACKGROUND OF THE INVENTION

Conventionally, the hydroponic cultivation of plants has been performed by an apparatus designed to constantly immerse the root of a plant in nutrient solution or by an apparatus permitting the root to grow in gravel, sand or the like by intermittently feeding nutrient solution so that the nutrient solution retained in the interstices of gravel, sand or the like may be absorbed by the root.

In the former case, since the root is constantly positioned in the nutrient solution, there is the shortage of oxygen supply to the root and the root is overfed with water, causing the decay or undergrowth of the root. Therefore, it has been impossible to achieve a satisfactory growth of plants.

In the latter case, if the interstices are made narrow enough to retain a sufficient amount of nutrient solution, this results in a failure to feed the root with sufficient oxygen. On the contrary, if the interstices are made wide enough to feed the root with sufficient oxygen, this results in the shortage of nutrient solution supply to the root. Thus, it is very difficult to control the state of the gravel or sand to obtain a desired size of the interstices.

Actually, it has been impossible to achieve a satisfactory growth of the root by controlling the interstices. Further, in order to feed nutrient solution intermittently, it is necessary either to arrange the apparatus so as to effect automatic feeding of nutrient solution at predetermined intervals of time or to feed it manually. In the former case, the apparatus itself is complicated and expensive. In the latter case, much labor is required for maintenance. In either case, it has been very difficult to determine the time intervals for supply of nutrient solution.

As a result of our extensive researches, we have obtained an apparatus for hydroponic cultivation of plants enabling the aforesaid problems to be solved all at once.

SUMMARY OF THE INVENTION

The present invention relates to an apparatus for cultivation of plants which, in reliably feeding the root of a plant with a sufficient amount of nutrient solution and oxygen to achieve satisfactory growth of the root of the plant by hydroponic cultivation, is capable of making effective use of a small amount of nutrient solution to cultivate plants with less labor involved in maintenance, and which is simple in construction and manufacture and easy to handle.

The present apparatus is adapted to suspend a plant at the root collar thereof by means of a sponge or the like, position the root of the plant in the air so as not to prevent the growth of the plant, constantly establish contact between the root and fresh air, install a screen capable of retaining nutrient solution, such as a woven fabric or a water-permeable sheet positioned on both sides of the root and extending vertically and horizontally for a suitable distance, contact the root with said screen, feed nutrient solution from above the screen to permit it to flow down therealong, permit the root to absorb the nutrient solution retained by the screen, thereby effecting the necessary and sufficient feeding of nutrient solution to the root.

In this manner since the necessary and sufficient feeding of nutrient solution and sufficient feeding of oxygen can be easily and reliably effected, root decay and undergrowth due to excessive moisture and shortage of oxygen can be positively prevented, so that satisfactory growth of plants by hydroponic cultivation can be achieved.

If the screen for feeding the root with nutrient solution has a suitable water retaining property, simply contacting the root with such screen is enough to ensure the reliable feeding of nutrient solution and oxygen and not only can the construction and manufacture of the apparatus be simple but also the handling thereof is very easy.

Even if nutrient solution is continuously fed in a circulatory manner, the feeding of oxygen to the root can be reliably effected. Therefore, unlike the system in which such nutrient solution is fed intermittently, there is no need to provide a complicate apparatus which makes it possible to automatically determine the feed time. As a result, the construction and manufacture of the apparatus can be made simpler and satisfactory growth of plants can be achieved by making effective use of a small amount of nutrient solution.

An object of the present invention is to provide an apparatus for hydroponic cultivation which ensures the feeding of a sufficient amount of nutrient solution and oxygen to the root of a plant to carry out satisfactory hydroponic cultivation which allows easy and reliable maintenance, and at the same time is simple in construction and manufacture and provides ease of handling.

More particularly, an object of the invention is to provide an apparatus for hydroponic cultivation which permits the use of simplified means for feeding nutrient solution and easily and reliably provides suitable conditions for the growth of plants.

A further object is to provide an apparatus for hydroponic cultivation which ensures reliability and easiness to satisfactory cultivation of plants by making effective use of a small amount of nutrient solution.

A further object is to provide an apparatus for hydroponic cultivation which can be used in such a condition that in order to repeatedly use the apparatus by removing the plants, such removal can be easily effected without leaving the roots behind.

A further object is to provide an apparatus for hydroponic cultivation wherein conditions for cultivation conforming to the growth of plants can be easily obtained.

BRIEF DESCRIPTION OF THE DRAWING

FIG. 1 is a perspective view with some parts omitted;

FIG. 2 is a side view showing the early stage of growth of plants when an apparatus consisting of three units is used; and FIG. 3 is a side view showing the full stage of growth of the plants of FIG. 2.

DETAILED DESCRIPTION OF THE PREFERRED EMBODIMENT

A preferred embodiment of the apparatus for hydroponic cultivation according to the present invention will now be described.

Reference will first be made to FIG. 1.

The numeral 1 denotes a screen capable of retaining nutrient solution, which screen is bent substantially in U-shape to provide two substantially parallel surfaces and suspended. The screen 1 may be made, for example, of a water-permeable sheet such as woven fabric or paper or of a water-impermeable sheet bored with many fine holes. Such sheets may have a napped surface. If necessary, the surface active agent may be applied to the screen 1 to promote the wettability of the screen 1 with respect to a nutrient solution. Further, if necessary, the surface of the screen is made dense to prevent the entry of the root of a plant, thereby to permit the removal of plants 2 without leaving the roots behind. The screen 1 extends vertically over a suitable distance so as not to be obstructive to the growth of the root and horizontally over a suitable distance so as to serve the plurality of plants 2, and it may be suspended to lie along one side of the plants 2.

The plants 2 are held between sponges 3 at their root collars and thereby suspended. The roots of the plants 2 being in contact with said screen 1 are positioned in the air so that they are also in contact with air to ensure a sufficient supply of oxygen. Various means may be employed to hold the plants 2 with their roots in contact with the screen, and conveniently such means will deform as the plants 2 grow, as in the case of sponges.

The reference numeral 4 denotes a tubular member, which is provided with a number of discharge holes 5 which are lengthwise arranged side by side, and nutrient solution flowing out through the discharge holes 5 is supplied to the screen 1 from above. The nutrient solution flows down along the screen 1, during which it is retained on the entire surface of the screen 1 to permit the roots of the plants 2 to absorb the nutrient solution from the screen 1. Therefore, the roots do not become immersed in the nutrient solution and hence excessive moistening of the roots is prevented.

The reference numeral 6 denotes a plate which is bent substantially U-shape to provide two substantially parallel surfaces facing one another and which is provided at the bottom with a bored support plate 17. The plate 6 includes rebent portions 7 at the oppositely disposed upper edges thereof. The tubular members 4 are respectively fitted in the rebent portions 7 and thereby held therein and the tubular member 4 cooperate with the plate 6 to hold the screen 1 therebetween. The discharge holes 5 of the tubular member 4 are opposed to the inner surfaces of the rebent portions 7, which define channels, and covered with the screen 1 in intimate contact therewith, so that the nutrient solution flows down uniformly over the entire surface of the screen 1. For uniformly supplying the screen 1 with the nutrient solution, instead of the tubular member 4, it is possible to use the rebent portions 7 themselves as gutters or utilize other means. The two tubular member 4 are placed with a sufficiently large spacing therebetween to facilitate the mounting and dismounting of the plants 2 with respect to the sponges 3.

Both lateral surface of the plate 6 are provided wih recesses 8 arranged in a plurality of rows, and pillars 10 erected on support blocks 9 are provided with projections adapted to be resiliently engaging with the recesses 8. The plates 6 is held between the pillars 10, so that it is vertically adjustable.

A plurality of plates 6 mounted on each of the movable blocks 9 are arranged side by side in a state of their spacings being variable. Thus, in the early stage of cultivation as shown in FIG. 2, the plates 6 are increased in their height and decreased in their spacings to provided for viewing the plants 2 with less labor and to decrease the floor space required. And as shown in FIG. 3, as the plants 2 grow, the plates 6 will be decreased in their heights and increased in their spacings to be able to observe the plants 2 with ease and to keep appropriate ventilation and ample sunshine.

Such plates 6 are capable of elastic deformation in such a manner as to change the width of the top port thereof and it has sponges 3 attached to the inner surface thereof at opposed places. Thus, as shown in FIG. 3, the sponges 3 and the plate 6 are enlarged as the roots grow, which means that the apparatus is effective even in the case where the growth of the roots is of utmost importance, such as a radish.

The bottom surface of the plate 6 is laterally inclined toward one side, so that the nutrient solution flowing down along the screens 1 is received in the plates 6 and are then collected into a storage tank 12 from all of the plates 6 via an inclined guide gutter 11. Other various means may be employed for recovering the nutrient solution.

A pipe 14 and relatively long flexible pipes 15 establish communication between the tubular member 4 of the plates 6 and an upper tank 13, and a drive-equipped liquid-lifting pump 16 lifts the nutrient solution from the storage tank 12 to pour it into the upper tank 13, thus constituting means for circulating the nutrient solution for re-use by refluxing the recovered nutrient solution to the tubular member 4. Therefore, it is possible to reliably carry out satisfactory cultivation of plants by making effective use of a small amount of nutrient solution.

That which is claimed is:

1. An apparatus for hydroponic cultivation of plants comprising, in combination:
   a. at least one deformable screen member open at its upper end and having two spaced apart substantially parallel inner surfaces, the space between said two inner surfaces being suitable for accommodating the root collar and root of at least one plant;
   b. means in contact with said screen member in the vicinity of its uppermost portion near said upper end for holding said screen member suspended in a space where air is freely ventilated, said means for holding said screen member having two spaced apart inwardly facing surfaces;
   c. resilient force applying means for exerting pressing forces inwardly on said screen member and thence on the root collar of at least one plant to suspend the plant between said inner surfaces of said screen member with its root in contact therewith, said resilient force applying means being positioned between outer surfaces of said screen member near its uppermost portion and said inwardly facing surfaces of said means for holding said screen member;
   d. means in fluid communication with said inner surfaces of said screen member for feeding nutrient-containing liquid to each said inner surface, which liquid can flow downwardly along each of these surfaces;
   e. means beneath said screen member for collecting the nutrient-containing liquid which has passed along said inner surfaces of said screen member; and f. means in contact with said means for holding for supporting said means for holding and thence said screen member in space;

whereby the space between the two inner surfaces of the screen member expands as the plant grows and the root collar of the plant exerts forces on the screen member and thence on the resilient force applying means causing the two inner surfaces of the screen member to spread apart at least along parts of their lengths.

2. An apparatus for hydroponic cultivation as set forth in claim 1, wherein said screen member comprises a water-permeable sheet.

3. An apparatus for hydroponic cultivation as set forth in claim 2, wherein said screen member has a surface active wetting agent applied thereto.

4. An apparatus as set forth in claim 1, wherein said means for feeding nutrient-containing liquid to said screen member comprises perforated tubular members disposed along the upper edge of said screen member, said perforations being arranged lengthwise thereof, and a supply source for furnishing said tubular members with the nutrient-containing liquid.

5. An apparatus for hydroponic cultivation as set forth in claim 1, wherein said resilient force applying means comprises sponges.

6. An apparatus for hydroponic cultivation as set forth in claim 1, wherein said means for holding said screen member comprises a bent plate with its apex obliquely disposed adjacent to the lower edge of said screen member, and wherein said means for collecting the nutrient-containing liquid comprises that portion of said bent plate adjacent said apex.

7. An apparatus for hydroponic cultivation as set forth in claim 6, wherein said means for collecting the nutrient-containing liquid further includes a storage tank for storing the nutrient-containing liquid collected from said bent plate, and a power driven liquid-lifting pump for circulating the nutrient-containing liquid with respect to said means for feeding the nutrient-containing liquid to said screen member.

8. An apparatus for hydroponic cultivation as set forth in claim 6, wherein the upper edges of said screen member are held between said perforated tubular members and the upper edges of said bent plate so that said screen member is suspended within said bent plate.

9. An apparatus for hydroponic cultivation as set forth in claim 8, wherein bent plate includes at its oppositely disposed upper edges rebent portions for holding said tubular members therein, and said screen member has portions which are held in said rebent portions by said tubular members.

10. An apparatus for hydroponic cultivation as set forth in claim 9, wherein said screen member is in intimate contact with said perforations in said tubular members.

11. An apparatus for hydroponic cultivation as set forth in claim 9, wherein said bent plate is flexible and includes upper edge portions that move transversely as the plant or plants grow.

12. An apparatus for hydroponic cultivation as set forth in claim 9, wherein said tubular members are connected to a water feeding tank through flexible conduits, and said bent plate is supported by pillars and is vertically adjustable with respect to said pillars, said pillars comprising said means for supporting said means for holding.

13. An apparatus for hydroponic cultivation as set forth in claim 12, wherein said pillars are mounted on transversely movable blocks, and a plurality of bent plates are arranged in juxtaposition.

14. An apparatus for hydroponic cultivation as set forth in claim 8, wherein said screen member includes a terminal portion which is maintained in spaced relation to said bent plate.

15. An apparatus for hydroponic cultivation as set forth in claim 1, wherein said screen member comprises a water-impermeable sheet.

16. An apparatus for hydroponic cultivation as set forth in claim 1, wherein said screen member has a napped surface.

17. An apparatus for hydroponic cultivation as set forth in claim 1, wherein said means for holding said screen member comprises a plate bent substantially in U-shape to provide two inwardly facing surfaces;

wherein said resilient force applying means comprises two sponges positioned on each of said two inwardly facing surfaces of said plate, the bend portion of said plate being positioned below said sponges and said sponges being in contact with said screen member;

wherein said means for feeding nutrient-containing liquid comprises two perforated tubular members positioned substantially horizontally on each of said two inner surfaces of said plate remote from the bent portion thereof and a pump for delivering liquid to said tubular members, the perforations in said tubular members being arranged in an axial direction for allowing the nutrient-containing liquid to flow out, upper edge portions of said screen member being held between said tubular members and said plate, and said screen member being suspended in space between said two inner surfaces of said plate and itself being bent substantially in U-shape; and wherein said means for collecting the nutrient-containing liquid comprises a trough defined by the bent portion of said plate which receives the nutrient-containing liquid which has flowed down along said screen member and a storage tank for receiving the nutrient-containing liquid from said trough, said pump means lifting the liquid to said storage tank and said tubular members being in fluid communication with said storage tank.

* * * * *